United States Patent
Wu et al.

(10) Patent No.: US 12,199,244 B2
(45) Date of Patent: Jan. 14, 2025

(54) LITHIUM-ION BATTERY, BATTERY MODULE, BATTERY PACK AND POWERED DEVICE

(71) Applicant: CONTEMPORARY AMPEREX TECHNOLOGY (HONG KONG) LIMITED, Hong Kong (CN)

(72) Inventors: Zeli Wu, Ningde (CN); Changlong Han, Ningde (CN); Cuiping Zhang, Ningde (CN); Bin Jiang, Ningde (CN); Zhiyong Ai, Ningde (CN); Lei Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/347,184

(22) Filed: Jul. 5, 2023

(65) Prior Publication Data
US 2023/0361352 A1 Nov. 9, 2023

Related U.S. Application Data

(63) Continuation of application No. PCT/CN2021/120317, filed on Sep. 24, 2021.

(51) Int. Cl.
| | |
|---|---|
| *H01M 10/0569* | (2010.01) |
| *H01M 4/525* | (2010.01) |
| *H01M 10/0525* | (2010.01) |
| *H01M 10/0567* | (2010.01) |
| *H01M 10/0568* | (2010.01) |
| *H01M 4/02* | (2006.01) |

(52) U.S. Cl.
CPC ....... *H01M 10/0569* (2013.01); *H01M 4/525* (2013.01); *H01M 10/0525* (2013.01); *H01M 10/0567* (2013.01); *H01M 10/0568* (2013.01); *H01M 2004/028* (2013.01); *H01M 2300/0028* (2013.01)

(58) Field of Classification Search
None
See application file for complete search history.

(56) References Cited

U.S. PATENT DOCUMENTS

| | | |
|---|---|---|
| 2016/0036092 A1 | 2/2016 | Ye et al. |
| 2019/0356013 A1 | 11/2019 | Sella et al. |

FOREIGN PATENT DOCUMENTS

| | | |
|---|---|---|
| CN | 107210490 A | 9/2017 |
| CN | 110265721 A | 9/2019 |
| CN | 110649317 A | 1/2020 |
| CN | 110767939 A | 2/2020 |
| CN | 111342028 | 6/2020 |
| CN | 111864261 A | 10/2020 |
| CN | 112615056 A | 4/2021 |
| CN | 112838270 A | 5/2021 |
| CN | 112909319 A | 6/2021 |
| CN | 113140799 A | 7/2021 |
| EP | 3913721 A1 | 11/2021 |
| JP | 2018504759 A | 2/2018 |
| KR | 20170113601 A | 10/2017 |
| WO | 2016025589 A1 | 2/2016 |
| WO | 2021108995 A1 | 6/2021 |

OTHER PUBLICATIONS

Decision to grant a patent dated Apr. 16, 2024 for Application No. JP 2022-546114.
Decision to Grant a Patent for Japan Application No. 2022-546114, dated Apr. 16, 2024, 3 pages.
Notification to Grant Patent Right for China Application No. 202180084957, dated Jul. 1, 2024, 1 page.
First Office Action for China Application No. 202180084957, issued Apr. 27, 2024, 5 pages.
Extended European Search Report for copending EP Application No. 21923586.8 dated Sep. 6, 2023.
Japanese OA1 for copending Japanese Patent Application No. 2022-546114 Notice of Reasons for Refusal dated Nov. 7, 2023.
ISR for International Application PCT/CN2021/120317 mailed Jun. 9, 2022.
Written Opinion for International Application PCT/CN2021/120317 mailed Jun. 9, 2022.
Korea Written Decision on Registration for Application No. 10-2022-7027653, mailed on Sep. 10, 2024, 3 pages.

*Primary Examiner* — Carlos Barcena
(74) *Attorney, Agent, or Firm* — Ladas & Parry LLP

(57) ABSTRACT

The present application discloses a lithium-ion battery, which has a positive electrode sheet, a negative electrode sheet, a separator, and an electrolyte solution comprising a lithium salt and a solvent, wherein based on the total weight of the electrolyte solution, the percentage by mass of the lithium salt in the electrolyte solution is a %, and the lithium ion battery satisfies 5≤a≤10; and the load on single side of the negative electrode sheet is W grams per 1540.25 mm2, and a and W satisfy 25≤a/W≤50; and the solvent comprises dimethyl carbonate. The lithium ion battery has good safety and high-temperature cycling performance, and also has good kinetic performance.

11 Claims, 4 Drawing Sheets

LITHIUM-ION BATTERY, BATTERY MODULE, BATTERY PACK AND POWERED DEVICE

CROSS-REFERENCE TO RELATED APPLICATIONS

This application is a continuation of PCT/CN2021/120317 filed on Sep. 24, 2021 and entitled "Lithium-ion battery, battery module, battery pack and powered device" which is incorporated herein by reference in its entirety.

TECHNICAL FIELD

The present application relates to the field of lithium ion batteries, and in particular, to a lithium ion battery having an electrolyte solution with a low concentration of a lithium salt, a battery module, a battery pack, and a powered device.

BACKGROUND

In recent years, with the increasingly wide use of lithium-ion batteries, lithium-ion batteries are widely used in energy storage power systems such as water power, thermal power, wind power and solar power stations, as well as power tools, electric bicycles, electric motorcycles, electric vehicles, military equipment, aerospace and other fields.

Typically, an electrolyte solution with a high concentrations of a lithium salt are used in the lithium ion batteries to obtain a high kinetic performance. However, $LiPF_6$, which is usually used as a lithium salt in the electrolyte solution, has poor thermal stability, and tends to decompose at high temperature to generate HF, which destroys the positive electrode material. However, the high concentration of $LiPF_6$ results in a high viscosity of the electrolyte solution, which is not conducive to the cycling performance. Lithium ion batteries having an electrolyte solution with a low concentration of a lithium salt are not only low in cost, but also have better thermal stability and cycling performance. However, when the lithium salt concentration is low, the conductivity of the electrolyte solution decreases, which affects the kinetic performance of the battery and restricts the practical use of lithium-ion batteries having an electrolyte solution with a low concentration of a lithium salt.

SUMMARY OF THE INVENTION

In view of the above-mentioned problems, an object of the present application is to provide a lithium ion battery which has good kinetic performance even when an electrolyte solution with a low concentration of a lithium salt is used.

To achieve the above object, a first aspect of the present application provides a lithium ion battery, which has a positive electrode sheet, a negative electrode sheet, a separator and an electrolyte solution comprising a lithium salt and a solvent, wherein, Based on the total weight of the electrolyte solution, the content of the lithium salt in percentage by mass in the electrolyte solution is $a$ %, and the lithium ion battery satisfies $5 \leq a \leq 10$.

The load on single side of the negative electrode sheet is W grams per 1540.25 $mm^2$, and $a$ and W satisfy $25 \leq a/W \leq 50$; and the solvent contains dimethyl carbonate.

Therefore, in the present application, by using a low concentration of a lithium salt and dimethyl carbonate in the electrolyte solution, the battery has good safety and high-temperature cycling performance, as well as good kinetic performance.

In any of the embodiments, based on the total weight of the electrolyte solution, the electrolyte solution contains $b$ % by mass of a positive electrode sacrificial additive, the content of dimethyl carbonate in percentage by mass in the electrolyte solution is $c$ %, and the Lithium-ion battery satisfies:

$$c \leq 10 \times b - 10 \times |0.6 - a/12.5|.$$

Thereby, the storage performance of the battery can be improved while the kinetic performance of the battery is improved.

In any of the embodiments, the positive electrode sacrificial additive is a compound represented by one of the following general formulas,

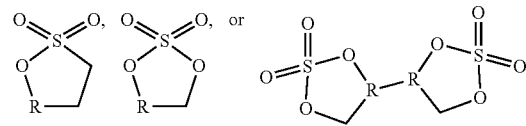

where R represents an alkylene group having 1-10 carbon atoms or a carbon atom optionally substituted by an alkyl group having 1-9 carbon atoms, and optionally, the positive electrode sacrificial additive is one or more selected from 1,3-propane sultone, ethylene sulfate and bis(ethylene sulfate).

Thus, a better effect of improving the storage performance of the battery can be obtained.

In any of the embodiments, $2 \leq b \leq 4$.

Thereby, the power performance and high-temperature cycling performance of the battery can be further improved.

In any of the embodiments, based on the total weight of the electrolyte solution, the content of dimethyl carbonate in percentage by mass in the electrolyte solution is $c$ %, and the lithium ion battery satisfies:

$$c \geq 10 \times (5 - 0.08 \times a/W).$$

Therefore, the kinetic performance of the battery is further sufficiently improved.

In any of the embodiments, the positive electrode sheet comprises a positive electrode active material $LiNi_xCo_yMn_zO_2$, where $x+y+z=1$, $0<x<1$, $0<y<1$, and $0<z<1$, optionally $0.1 \leq x \leq 0.8$, and further preferably $0.1 \leq x \leq 0.5$.

Thus, the capacity density and the storage performance of the battery, especially the suppression of gas production during storage, are taken into account.

In any of the embodiments, the lithium salt is $LiPF_6$. The high-temperature stability and high-temperature cycling performance of such a battery can be significantly improved.

In any of the embodiments, $5 \leq a \leq 7.5$. The kinetic performance of such a battery is significantly improved.

A second aspect of the present application provides a battery module, which includes the lithium-ion battery according to the first aspect of the present application.

A third aspect of the present application provides a battery pack, which includes the battery module according to the second aspect of the present application.

A fourth aspect of the present application provides a powered device, which includes at least one selected from the lithium ion battery according to the first aspect of the present application, the battery module according to the second aspect of the present application, or the battery pack according to the third aspect of the present application.

Figure 1:
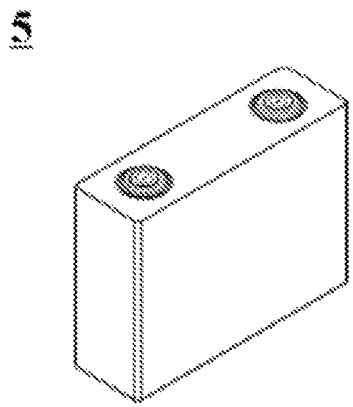
FIG. 1 is a schematic view of a lithium-ion battery according to an embodiment of the present application.

LIST OF REFERENCE NUMERALS 1 battery pack; 2 upper box; 3 lower box; 4 battery module; 5 lithium ion battery; 51 case; 52 electrode assembly; 53 top cover assembly

DETAILED DESCRIPTION

Hereinafter, embodiments of the lithium ion battery, its manufacturing method, the battery module, the battery pack, and the powered device of the present application will be described in detail with reference to the accompanying drawings as appropriate. However, unnecessary detailed descriptions may be omitted in some cases. For example, there are cases where detailed descriptions of well-known items and repeated descriptions of actually identical structures are omitted, to avoid unnecessary redundancy in the following descriptions and to facilitate the understanding by those skilled in the art. In addition, the accompanying drawings and following descriptions are provided for fully understanding the present application by those skilled in the art, and are not intended to limit the subject matter recited in the claims.

"Range" disclosed herein is defined by a lower limit and an upper limit, with a given range being defined by the selection of a lower limit and an upper limit defining the boundaries of the particular range. A range defined in this manner may be inclusive or exclusive, and may be arbitrarily combined, that is, any lower limit may be combined with any upper limit to form a range. For example, if the ranges of 60-120 and 80-110 are listed for a particular parameter, it is to be understood that the ranges of 60-110 and 80-120 are also contemplated. Additionally, if the minimum range values 1 and 2 are listed, and if the maximum range values 3, 4, and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and "0-5" is just an abbreviated representation of the combination of these numerical values. In addition, when a parameter is expressed as an integer that is ≥2, it is essentially disclosed that the parameter is, for example, the integer 2, 3, 4, 5, 6, 7, 8, 9, 10, 11, 12, and the like.

All the embodiments and optional embodiments of the present application can be combined with each other to form new technical solutions, unless particularly stated otherwise.

All technical features and optional technical features of the present application can be combined with each other to form a new technical solution, unless particularly stated otherwise.

The terms "comprise", "comprising", "include" and "including" mentioned in the present application may be open-ended or closed-ended. For example, the terms "comprise", "comprising", "include" and "including" can mean that other components not listed may also be included or comprised, or only the listed components are included or comprised.

In the present application, the term "or" is inclusive unless particularly stated otherwise. For example, the phrase "A or B" means "A, B, or both A and B." More specifically, the condition "A or B" is satisfied by any of the following: A is true (or present) and B is false (or absent); A is false (or absent) and B is true (or present); or both A and B are true (or present).

Typically, the lithium salt concentration is generally high in the electrolyte solution in the existing lithium ion batteries to obtain a high kinetic performance. The lithium salts used in lithium ion batteries are mostly $LiPF_6$. However, $LiPF_6$ has poor thermal stability, and tends to decompose at high temperature to generate HF, which destroys the positive electrode material. However, the high concentration of $LiPF_6$ results in a high viscosity of the electrolyte solution at a low temperature, which is not conducive to the cycling performance. Reducing the concentration of $LiPF_6$ not only reduces the cost, but also improves the thermal stability and cycling performance of lithium-ion batteries. However, a low concentration of a lithium salt results in low conductivity of the electrolyte solution, which affects the kinetic performance of the battery. Therefore, it is desirable to improve the kinetic performance of lithium-ion batteries having an electrolyte solution with a low concentration of a lithium salt to make such lithium-ion batteries suitable for practical use.

The present inventors find through various explorations that for a specific lithium-ion battery having an electrolyte solution with a low concentration of a lithium salt, the kinetic performance of the lithium-ion battery can be significantly improved by adding dimethyl carbonate (DMC) to the electrolyte solution.

The thus obtained lithium-ion battery having an electrolyte solution with a low concentration of a lithium salt are applicable to various situations, such as electric bicycles, energy storage base stations, taxis, scooters, and the like.

Specifically, in an embodiment of the present application, a lithium-ion battery is provided, which has a positive electrode sheet, a negative electrode sheet, a separator, and an electrolyte solution comprising a lithium salt and a solvent.

Based on the total weight of the electrolyte solution, the content of the lithium salt in percentage by mass in the electrolyte solution is a %, and the lithium ion battery satisfies 5≤a≤10.

The load on single side of the negative electrode sheet is W grams per 1540.25 mm², and a and W satisfy 25≤a/W≤50; and the solvent contains dimethyl carbonate.

The load on single side of the negative electrode sheet is the amount of the negative electrode film layer on single side of the negative electrode sheet.

Although the mechanism is not yet clear, the present applicant unexpectedly finds that by adding dimethyl carbonate to the electrolyte solution in a lithium ion battery that satisfies the above-mentioned lithium salt concentration and the load on the negative electrode sheet in the present application, the dynamic performance of the battery can be significantly improved. Since the lithium salt concentration in the electrolyte solution of the battery is between 5 and 10 wt %, the decomposition of the lithium salt is reduced, the viscosity of the electrolyte solution is lower, and the high-temperature cycling performance is better. Moreover, a/W represents the lithium salt concentration relative to the load per unit area of the negative electrode sheet, which is related to the diffusion kinetics of lithium ions in the negative electrode. When the value of a/W is small, the load on the negative electrode is high, so the energy density is high. However, in this case, the transmission path of lithium ions is long, there is more disordered transmission, the intercalation and deintercalation of lithium ions are difficult, and the available lithium ions are less. That is to say, although the lithium-ion battery with a and a/W values satisfying the above-mentioned ranges has good safety and high-temperature cycling performance, the kinetic performance is poor. Through numerous experiments, it is found that the use of DMC in the solvent can improve the dynamic performance of the battery.

The range of W can be selected by those skilled in the art according to actual needs, and usually, W is in the range of 0.1-0.25 g/1540.25 mm².

In some embodiments, based on the total weight of the electrolyte solution, the electrolyte solution contains b % by mass of a positive electrode sacrificial additive, the content of dimethyl carbonate in percentage by mass in the electrolyte solution is c %, and the lithium-ion battery satisfies:

$$c \leq 10 \times b - 10 \times |0.6 - a/12.5|.$$

When DMC is oxidized, a gas is produced. Therefore, the addition of DMC may cause gas production during storage of the battery, which affects the storage performance of the battery. The positive electrode sacrificial additive can be oxidized on the surface of the positive electrode in preference to the solvent, so the addition of the positive electrode sacrificial additive can prevent the DMC from being oxidized. Moreover, the amount of DMC is also related to the concentration of the lithium salt. When the concentration of the lithium salt is relatively high or low, the improvement of DMC on the kinetic performance of the battery becomes more and more limited. In this case, reducing the amount of DMC will not affect the kinetic performance of the battery greatly, but is beneficial to reducing the gas production caused by oxidation of DMC. The inventors find that given the concentration c % of DMC, the concentration b % of the positive electrode sacrificial additive and the concentration a % of the lithium salt satisfying the above relationships, the storage performance of the battery can be improved while the kinetic performance of the battery is improved.

In some embodiments, the positive electrode sacrificial additive is a compound represented by one of the following general formulas,

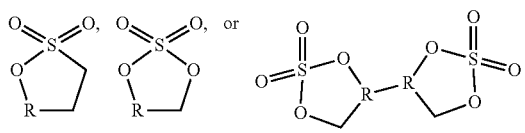

where R represents an alkylene group having 1-10 carbon atoms or a carbon atom optionally substituted by an alkyl group having 1-9 carbon atoms, optionally, the positive electrode sacrificial additive is one or more selected from 1,3-propane sultone (1,3-PS), ethylene sulfate (DTD) and bis(ethylene bisulfate) (bis-DTD).

By specifically selecting the positive electrode sacrificial additive, a better effect of improving the storage performance of the battery can be obtained.

In some embodiments, $2 \leq b \leq 4$. By further defining the amount of the positive electrode sacrificial additive, it is ensured that high degree of oxidation of the positive electrode sacrificial additive on the surface of the positive electrode can be prevented to avoid the influence on the power performance and cycling performance of the battery, while the positive electrode sacrificial additive functions fully, so that the power performance and high-temperature cycling performance of the battery can be further improved.

In some embodiments, based on the total weight of the electrolyte solution, the content of dimethyl carbonate in percentage by mass in the electrolyte solution is c %, and the lithium ion battery satisfies:

$$c \geq 10 \times (5 - 0.08 \times a/W).$$

As mentioned previously, a/W is related to the diffusion kinetics of lithium ions in the negative electrode. With the increasing value of $(5 - 0.08 \times a/W)$, the kinetic performance of the battery becomes worse. The present inventors find that when the concentration c % of dimethyl carbonate and a/W satisfy the above relationship, the kinetic performance of the battery can be more fully improved.

In some embodiments, c % is optionally in the range of 5-50%, optionally in the range of 9-30%.

In some embodiments, the positive electrode sheet comprises a positive electrode active material $LiNi_xCo_yMn_zO_2$, where $x+y+z=1$, $0<x<1$, $0<y<1$, and $0<z<1$, optionally $0.1 \leq x \leq 0.8$, and further optionally $0.1 \leq x \leq 0.5$.

By the selection of the value of x, the capacity density and the storage performance of the battery, especially the suppression of gas production during storage, are taken into account.

In some embodiment, the lithium salt is $LiPF_6$. Compared with lithium-ion batteries where the lithium salt in the electrolyte solution is other kinds of lithium salts, lithium-ion batteries where the lithium salt is exclusively $LiPF_6$ is more prone to problems associated with high-temperature stability and high-temperature cycling performance. By satisfying the above conditions, the high-temperature stability and high-temperature cycling performance of the lithium ion battery can be significantly improved, and the dynamic performance of the battery is ensured.

In some embodiments, $5 \leq a \leq 7.5$. For a lithium ion battery having such a lithium salt concentration, the kinetic performance of the battery can be significantly improved by satisfying the above conditions.

Further, the lithium ion battery, the battery module, the battery pack, and the powered device of the present application will be described below with reference to the accompanying drawings.

Typically, the lithium ion battery pack includes a positive electrode sheet, a negative electrode sheet, an electrolyte, and a separator. During the charge and discharge process of the battery, active ions are intercalated and deintercalated repeatedly between the positive electrode sheet and the negative electrode sheet. The electrolyte serves to conduct ions between the positive electrode sheet and the negative electrode sheet. The separator is provided between the positive electrode sheet and the negative electrode sheet, and mainly functions to prevent a short circuit between the positive electrode and the negative electrode while allowing ions to pass through.

[Positive Electrode Sheet]

The positive electrode sheet includes a positive electrode current collector and a positive electrode film layer provided on at least one surface of the positive electrode current collector, where the positive electrode film layer comprises a positive electrode active material.

By way of example, the positive electrode current collector has two opposite surfaces in the direction of its own thickness, and the positive electrode film layer is provided on either or both of the two opposite surfaces of the positive electrode current collector.

In some embodiments, the positive electrode current collector can be a metal foil or a composite current collector. For example, an aluminum foil can be used as the metal foil. The composite current collector may include a high molecular material substrate layer and a metal layer formed on at least one surface of the high molecular material substrate layer. The composite current collector can be formed by forming the metal material (aluminium, aluminium alloy, nickel, nickel alloy, titanium, titanium alloy, silver and silver alloy, etc.) on the high molecular material substrate (such substrate as polypropylene (PP), polyethylene terephthalate (PET), polybutylene terephthalate (PBT), polystyrene (PS), and polyethylene (PE), etc.).

In some embodiments, the positive electrode active material may be a positive electrode active material for batteries known in the art. For example, the positive electrode active material may include at least one of a lithium-containing phosphate of olivine-structure, a lithium transition metal oxide, and a modified compounds thereof. However, the present application is not limited to these materials, and other conventional materials useful as positive electrode active materials for batteries can also be used. These positive electrode active materials may be used alone or in combination of two or more. Among them, examples of the lithium transition metal oxide may include, but are not limited to, at least one of a lithium-cobalt oxide (such as $LiCoO_2$), a lithium-nickel oxide (such as $LiNiO_2$), a lithium-manganese oxide (such as $LiMnO_2$, and $LiMn_2O_4$), a lithium-nickel-cobalt oxide, a lithium-manganese-cobalt oxide, a lithium-nickel-manganese oxide, a lithium-nickel-cobalt-manganese oxide (such as $LiNi_{0.5}Co_{0.2}Mn_{0.3}O_2$ (also referred to as NCM333), $LiNi_{0.5}Co_{0.2}Mn_{0.3}O_2$ (also referred to as NCM523), $LiNi_{0.5}Co_{0.25}Mn_{0.25}O_2$ (also referred to as NCM211), $LiNi_{0.6}Co_{0.2}Mn_{0.2}O_2$ (also referred to as NCM622), and $LiNi_{0.8}Co_{0.1}Mn_{0.1}O_2$ (also referred to as NCM811)), a lithium-nickel-cobalt-aluminum oxide (such as $LiNi_{0.85}Co_{0.15}Al_{0.05}O_2$) and a modified compound thereof. Examples of the lithium-containing phosphate of olivine-structure may include, but are not limited to, at least one of lithium iron phosphate (such as $LiFePO_4$ (also referred to as LFP)), a composite material of lithium iron phosphate and carbon, lithium manganese phosphate (such as $LiMnPO_4$), a composite material of lithium manganese phosphate and carbon, lithium iron manganese phosphate, and a composite material of lithium manganese iron phosphate and carbon.

In some embodiments, the positive electrode film layer further optionally comprises a binder. For example, the binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer and a fluorine-containing acrylate resin.

In some embodiments, the positive electrode film layer further optionally comprises a conductive agent. For example, the conductive agent may include at least one of superconducting carbon, acetylene black, carbon black, Ketjen black, carbon dot, carbon nanotubes, graphene, and carbon nanofibers.

In some embodiments, the positive electrode sheet can be prepared by dispersing the components for preparing the positive electrode sheet, for example, the positive electrode active material, the conductive agent, the binder and any other components in a solvent (for example, N-methyl pyrrolidone) to form a positive electrode slurry; and applying the positive electrode slurry on a positive electrode current collector, followed by oven drying, cold pressing and other procedures, to obtain the positive electrode sheet.

[Negative Electrode Sheet]

The negative electrode sheet includes a negative electrode current collector and a negative electrode film layer provided on at least one surface of the negative electrode current collector, wherein the negative electrode film layer comprises a negative electrode active material.

By way of example, the negative electrode current collector has two opposite surfaces in the direction of its own thickness, and the negative electrode film layer is provided on either or both of the two opposite surfaces of the negative electrode current collector.

In some embodiments, the negative electrode current collector can be a metal foil or a composite current collector. For example, a copper foil can be used as the metal foil. The composite current collector may include a high molecular material substrate layer and a metal layer formed on at least one surface of the high molecular material substrate. The composite current collector can be formed by forming the metal material (copper, copper alloy, nickel, nickel alloy, titanium, titanium alloy, silver and silver alloy, etc.) on the high molecular material substrate (such substrate as polypropylene (PP), polyethylene terephthalate (PET), polybutylene terephthalate (PBT), polystyrene (PS), and polyethylene (PE), etc.).

In some embodiments, the negative electrode active material may be a negative electrode active material for batteries known in the art. For example, the negative electrode active material may include at least one of artificial graphite, natural graphite, soft carbon, hard carbon, silicon-based materials, tin-based materials, lithium titanate, and the like. The silicon-based material may be at least one selected from elemental silicon, a silicon-oxygen compound, a silicon-carbon composite, a silicon-nitrogen composite, and a silicon alloy. The tin-based material may be at least one selected from elemental tin, a tin-oxygen compound, and a tin alloy. However, the present application is not limited to these materials, and other conventional materials useful as negative electrode active materials for batteries can also be used. These negative electrode active materials may be used alone or in combination of two or more.

In some embodiments, the negative electrode film layer further optionally comprises a binder. The binder may be at least one selected from styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), an acrylate, and carboxymethyl chitosan (CMCS).

In some embodiments, the negative electrode film layer further optionally comprises a conductive agent. The conductive agent may be at least one selected from superconducting carbon, acetylene black, carbon black, Ketjen black, carbon dot, carbon nanotubes, graphene, and carbon nanofibers.

In some embodiments, the negative electrode film layer may further optionally comprise other auxiliaries, for example, a thickener (e. g., sodium carboxymethyl cellulose (CMC-Na)) and the like.

In some embodiments, the negative electrode sheet can be prepared by dispersing the components for preparing the negative electrode sheet, for example, the negative electrode active material, the conductive agent, the binder and any other components in a solvent (for example, deionized water) to form a negative electrode slurry; and applying the negative electrode slurry on a negative electrode current collector, followed by oven drying, cold pressing and other procedures, to obtain the negative electrode sheet.

[Electrolyte]

The electrolyte serves to conduct ions between the positive electrode sheet and the negative electrode sheet. In the present application, the electrolyte is an electrolyte solution. The electrolyte solution comprises an electrolyte salt and a solvent.

In some embodiments, the electrolyte salt can be at least one selected from lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro(oxalato)borate, lithium bis(oxalate)borate, lithium difluoro bis(oxalato)phosphate, and lithium tetrafluoro(oxalato)phosphate.

In some embodiments, the solvent may comprise, in addition to DMC, at least one selected from ethylene carbonate (EC), propylene carbonate, methyl ethyl carbonate (EMC), diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate ethyl propionate, propyl propionate, methyl butyrate, ethyl butyrate, 1,4-butyrolactone, sulfolane, dimethyl sulfone, methyl ethyl sulfone and diethyl sulfone.

In some embodiments, the electrolyte solution further optionally comprises an additive. For example, the additive may include a negative electrode film-forming additive, a positive electrode film-forming additive, and also an additive capable of improving certain properties of the battery, such as an additive for improving the overcharge performance of the battery, and an additive for improving the high-temperature or low-temperature performance of the battery, etc.

[Separator]

In some embodiments, the lithium-ion battery further includes a separator. The type of the separator is not particularly limited in the present application, and any well-known separator with a porous structure having good chemical stability and mechanical stability may be used.

In some embodiments, the material of the separator may be at least one selected from glass fibers, non-woven fabric, polyethylene, polypropylene, and polyvinylidene fluoride. The separator is not particularly limited, and may be a single-layer film or a multi-layer composite film. When the separator is a multi-layer composite film, the material of each layer may be the same or different, and there is no particular limitation.

In some embodiments, the positive electrode sheet, the negative electrode sheet, and the separator can be made into an electrode assembly by a winding process or a lamination process.

In some embodiments, the lithium-ion battery can also include an outer package. The outer package can be used to encapsulate the above-mentioned electrode assembly and electrolyte.

In some embodiments, the outer package of the lithium-ion battery can be a hard case, such as a hard plastic case, an aluminum case, a steel case, and the like. The outer package of the lithium-ion battery can also be a soft pack, such as a bag-type soft pack. The material of the soft pack can be a plastic, and examples of the plastic include polypropylene, polybutylene terephthalate and polybutylene succinate, etc.

The shape of the lithium-ion battery is not particularly limited in the present application, and may be cylindrical, square or of any other shapes. For example, FIG. 1 shows an example of a lithium-ion battery 5 having a square structure.

Figure 2:
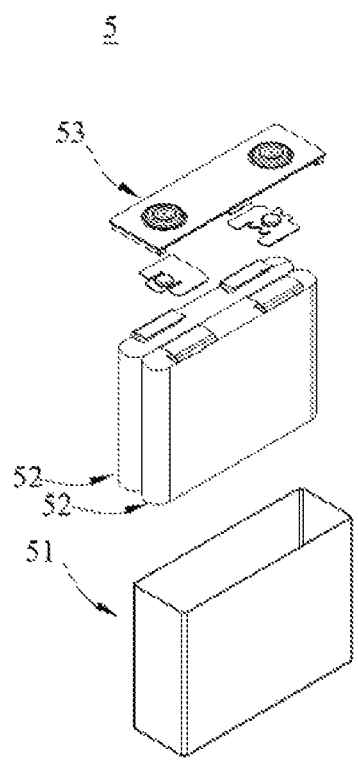
FIG. 2 is an exploded view of the lithium-ion battery according to the embodiment of the present application shown in FIG. 1.

In some embodiments, referring to FIG. 2, the outer package may include a case 51 and a cover plate 53. Here, the case 51 can include a bottom plate and a side plate connected to the bottom plate, where the bottom plate and the side plate defines an accommodating cavity. The case 51 has an opening that communicates with the accommodating cavity, and the cover plate 53 can cover the opening to close the accommodating cavity. The positive electrode sheet, the negative electrode sheet, and the separator may be formed into an electrode assembly 52 by a winding process or a lamination process. The electrode assembly 52 is encapsulated within the accommodating cavity. The electrolyte solution impregnates the electrode assembly 52. The number of electrode assembly 52 contained in the lithium-ion battery 5 may be one or more, and can be selected by those skilled in the art according to specific practical needs.

In some embodiments, the lithium-ion battery can be assembled into a battery module, the number of lithium-ion battery contained in the battery module may be one or more, and the specific number can be selected by those skilled in the art according to the use and capacity of the battery module.

Figure 3:
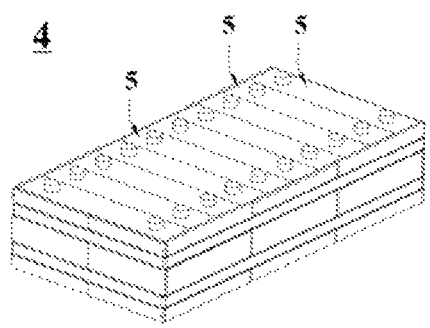
FIG. 3 is a schematic view of a battery module according to an embodiment of the present application.

FIG. 3 shows an example of a battery module 4. Referring to FIG. 3, in the battery module 4, a plurality of lithium-ion batteries 5 is sequentially arranged along a length direction of the battery module 4. Of course, any other arrangement is also possible. The plurality of lithium-ion batteries 5 may further be fixed by fasteners.

Optionally, the battery module 4 may further include a shell having an accommodating space, in which the plurality of lithium-ion batteries 5 are accommodated.

In some embodiments, the battery module may further be assembled into a battery pack, and the number of battery module contained in the battery pack may be one or more, and can be selected by those skilled in the art according to the use and capacity of the battery pack.

Figure 4:
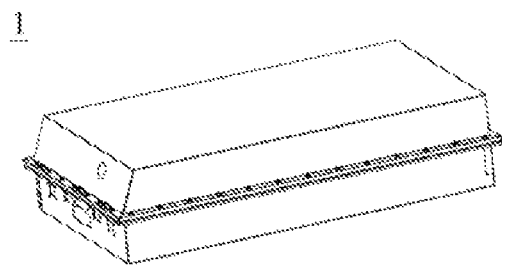
FIG. 4 is a schematic view of a battery pack according to an embodiment of the present application.
Figure 5:
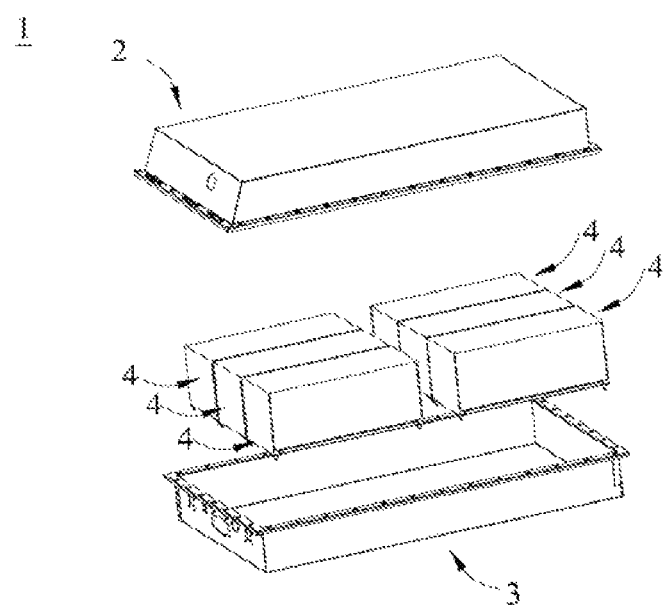
FIG. 5 is an exploded view of the battery pack according to the embodiment of the present application shown in FIG. 4.

FIGS. 4 and 5 shows an example of a battery pack 1. Referring to FIGS. 4 and 5, the battery pack 1 may include a battery box and a plurality of battery modules 4 provided in the battery box. The battery box includes an upper box 2 and a lower box 3, where the upper box 2 can cover the lower box 3, and defines an enclosed space for accommodating the battery module 4. The plurality of battery modules 4 can be arranged in the battery box in any pattern.

In addition, the present application further provides a powered device, which includes at least one of the lithium-ion battery, the battery module, or the battery pack provided in the present application. The lithium-ion battery, the battery module or the battery pack may be used as a power source for the powered device or an energy storage unit for the powered device. The powered device may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, an energy storage system, etc.

The lithium-ion battery, the battery module, or the battery pack can be selected for use in the powered device according to the requirements during use.

Figure 6:
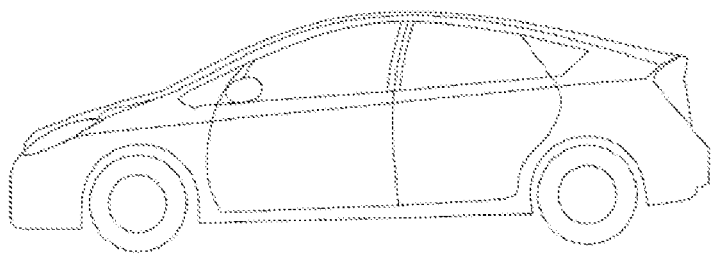
FIG. 6 is a schematic view of a powered device where a lithium-ion battery according to an embodiment of the present application is used as a power source.

FIG. 6 shows an example of a powered device. The powered device is an all-electric vehicle, a hybrid electric vehicle, or a plug-in hybrid electric vehicle, etc. In order to meet the requirements raised by the powered device for high power and high energy density of lithium-ion batteries, the battery pack or the battery module may be adopted.

The device may also be, for example, a mobile phone, a tablet computer, and a laptop, etc. The device is typically required to be thin, and the lithium-ion battery may be adopted as a power source.

EXAMPLES

Examples of the present invention will be described hereinafter. The examples described below are exemplary and only used to explain the present application, and should not be construed as a limitation on the present application. Where specific techniques or conditions are not indicated in the examples, the techniques or conditions described in the literatures in the art or described in the product specifications are followed. Where the manufacturers are not specified, the reagents or instruments used are conventional products and are commercially available.

Example 1

(1) Preparation of Electrolyte Solution

In a glove box under an argon atmosphere with a moisture content of <10 ppm, 30 g of EC, 50 g of EMC, 10 g of DMC and 10 g of $LiPF_6$ were respectively added to a beaker, and dissolved by fully stirring to obtain an electrolyte solution for use in this example.

(2) Preparation of Positive Electrode Sheet

The positive electrode active material $LiNi_{0.8}Co_{0.1}Mn_{0.1}O_2$, the binder polyvinylidene fluoride, and the conductive agent acetylene black were mixed iat a mass ratio of 8:1:1, and the solvent NMP was added and stirred in a vacuum mixer to obtain a positive electrode slurry. 0.28 g (dry weight)/1540.25 mm² of the positive electrode slurry was uniformly coated on an aluminum foil with a thickness of 13 μm as a positive electrode current collector. The aluminum foil was air dried at room temperature, then transferred to and dried in an oven at 120° C. for 1 hr, and then cold-pressed and slit to obtain a positive electrode sheet.

(3) Preparation of Negative Electrode Sheet

The negative electrode active material artificial graphite, the conductive agent carbon black, and the binder acrylate were mixed at a mass ratio of 92:2:6, and deionized water was added and stirred in a vacuum mixer to obtain a negative electrode slurry. 0.2 g (dry weight)/1540.25 mm² of the negative electrode slurry was uniformly coated on a copper foil with a thickness of 8 μm as a negative electrode current collector. The copper foil was air dried at room temperature, then transferred to and dried in an oven at 120° C. for 1 hr, and then cold-pressed and slit to obtain a negative electrode sheet.

(4) Separator

The separator was, model cellgard2400 purchased from Cellgard.

(5) Lithium-Ion Battery

The positive electrode sheet, the separator and the negative electrode sheet were stacked in sequence, so that the separator was positioned between the positive electrode sheet and the negative electrode sheet to serve for isolation, and then the system was wound to obtain a bare battery cell. A bare battery cell with a capacity of 4.3 Ah was placed in an outer package foil. 12 g of the electrolyte solution prepared above was injected into the dried battery, and a lithium ion battery was obtained after vacuum packaging, standing, chemical formation, and shaping.

Example 2

The preparation process of the lithium ion battery was generally the same as that in Example 1, except that the electrolyte solution was prepared as follows. In a glove box under an argon atmosphere with a moisture content of <10 ppm, 30 g of EC, 52 g of EMC, 10 g of DMC, and 8 g of $LiPF_6$ were respectively added to a beaker, and dissolved by fully stirring to obtain an electrolyte solution for use in this example.

Example 3

The preparation process of the lithium ion battery was generally the same as that in Example 1, except that the electrolyte solution was prepared as follows. In a glove box under an argon atmosphere with a moisture content of <10 ppm, 30 g of EC, 52.5 g of EMC, 10 g of DMC and 7.5 g of $LiPF_6$ were respectively added to a beaker, and dissolved by fully stirring to obtain an electrolyte solution for use in this example.

Example 4

The preparation process of the lithium ion battery was generally the same as that in Example 1, except that the electrolyte solution was prepared as follows. In a glove box under an argon atmosphere with a moisture content of <10 ppm, 30 g of EC, 55 g of EMC, 10 g of DMC and 5 g of $LiPF_6$ were respectively added to a beaker, and dissolved by fully stirring to obtain an electrolyte solution for use in this example.

Example 5

The preparation process of the lithium ion battery was generally the same as that in Example 1, except that the electrolyte solution was prepared as follows. In a glove box under an argon atmosphere with a moisture content of <10 ppm, 30 g of EC, 16 g of EMC, 40 g of DMC, 10 g of $LiPF_6$, and 4 g of 1,3-PS were respectively added to a beaker, and dissolved by fully stirring to obtain an electrolyte solution for use in this example.

Example 6

The preparation process of the lithium ion battery was generally the same as that in Example 1, except that the electrolyte solution was prepared as follows. In a glove box under an argon atmosphere with a moisture content of <10 ppm, 30 g of EC, 26 g of EMC, 30 g of DMC, 10 g of LiPF$_6$, and 4 g of 1,3-PS were respectively added to a beaker, and dissolved by fully stirring to obtain an electrolyte solution for use in this example.

Example 7

The preparation process of the lithium ion battery was generally the same as that in Example 1, except that the electrolyte solution was prepared as follows. In a glove box under an argon atmosphere with a moisture content of <10 ppm, 30 g of EC, 26 g of EMC, 30 g of DMC, 10 g of LiPF$_6$, and 4 g of DTD were respectively added to a beaker, and dissolved by fully stirring to obtain an electrolyte solution for use in this example.

Example 8

The preparation process of the lithium ion battery was generally the same as that in Example 1, except that the electrolyte solution was prepared as follows. In a glove box under an argon atmosphere with a moisture content of <10 ppm, 30 g of EC, 26 g of EMC, 30 g of DMC, 10 g of LiPF$_6$, and 4 g of bis-DTD were respectively added to a beaker, and dissolved by fully stirring to obtain an electrolyte solution for use in this example.

Example 9

The preparation process of the lithium ion battery was generally the same as that in Example 1, except that the electrolyte solution was prepared as follows. In a glove box under an argon atmosphere with a moisture content of <10 ppm, 30 g of EC, 43 g of EMC, 15 g of DMC, 10 g of LiPF$_6$, and 2 g of 1,3-PS were respectively added to a beaker, and dissolved by fully stirring to obtain an electrolyte solution for use in this example.

Example 10

The preparation process of the lithium ion battery was generally the same as that in Example 1, except that the electrolyte solution was prepared as follows. In a glove box under an argon atmosphere with a moisture content of <10 ppm, 30 g of EC, 47 g of EMC, 10 g of DMC, 10 g of LiPF$_6$, and 3 g of 1,3-PS were respectively added to a beaker, and dissolved by fully stirring to obtain an electrolyte solution for use in this example.

Example 11

The preparation process of the lithium ion battery was generally the same as that in Example 1, except that the electrolyte solution was prepared as follows. In a glove box under an argon atmosphere with a moisture content of <10 ppm, 30 g of EC, 47 g of EMC, 9 g of DMC, 10 g of LiPF$_6$, and 4 g of 1,3-PS were respectively added to a beaker, and dissolved by fully stirring to obtain an electrolyte solution for use in this example.

Example 12

The preparation process of the lithium ion battery was generally the same as that in Example 1, except that the electrolyte solution was prepared as follows. In a glove box under an argon atmosphere with a moisture content of <10 ppm, 30 g of EC, 25 g of EMC, 30 g of DMC, 10 g of LiPF$_6$, and 5 g of 1,3-PS were respectively added to a beaker, and dissolved by fully stirring to obtain an electrolyte solution for use in this example.

Example 13

The preparation process of the lithium ion battery was generally the same as that in Example 1, except that the electrolyte solution was prepared as follows. In a glove box under an argon atmosphere with a moisture content of <10 ppm, 30 g of EC, 42 g of EMC, 15 g of DMC, 10 g of LiPF$_6$, and 3 g of 1,3-PS were respectively added to a beaker, and dissolved by fully stirring to obtain an electrolyte solution for use in this example.

Example 14

The preparation process of the lithium ion battery was generally the same as that in Example 1, except that the electrolyte solution was prepared as follows. In a glove box under an argon atmosphere with a moisture content of <10 ppm, 30 g of EC, 52 g of EMC, 5 g of DMC, 10 g of LiPF$_6$, and 3 g of 1,3-PS were respectively added to a beaker, and dissolved by fully stirring to obtain an electrolyte solution for use in this example.

Example 15

The preparation process of the lithium ion battery was generally the same as that in Example 1, except that the electrolyte solution was prepared as follows. In a glove box under an argon atmosphere with a moisture content of <10 ppm, 30 g of EC, 46.5 g of EMC, 12 g of DMC, 10 g of LiPF$_6$, and 1.5 g of 1,3-PS were respectively added to a beaker, and dissolved by fully stirring to obtain an electrolyte solution for use in this example.

Example 16

The preparation process of the lithium ion battery was generally the same as that in Example 1, except that the electrolyte solution was prepared as follows. In a glove box under an argon atmosphere with a moisture content of <10 ppm, 30 g of EC, 37 g of EMC, 20 g of DMC, 10 g of LiPF$_6$, and 3 g of 1,3-PS were respectively added to a beaker, and dissolved by fully stirring to obtain an electrolyte solution for use in this example.

Comparative Example 1

The preparation process of the lithium ion battery was generally the same as that in Example 1, except that the electrolyte solution was prepared as follows. In a glove box under an argon atmosphere with a moisture content of <10 ppm, 33.75 g of EC, 56.25 g of EMC, and 10 g of LiPF$_6$ were respectively added to a beaker, and dissolved by fully stirring to obtain an electrolyte solution for use in this comparative example.

Comparative Example 2

The preparation process of the lithium ion battery was generally the same as that in Example 1, except that in a glove box under an argon atmosphere with a moisture content of <10 ppm, 36.38 g of EC, 60.62 g of EMC, and 3 g of LiPF$_6$ were respectively added to a beaker, and dissolved by fully stirring to obtain an electrolyte solution for use in this comparative example.

Comparative Example 3

The preparation process of the lithium ion battery was generally the same as that in Example 1, except that in a glove box under an argon atmosphere with a moisture content of <10 ppm, 33 g of EC, 55 g of EMC, and 12 g of $LiPF_6$ were respectively added to a beaker, and dissolved by fully stirring to obtain an electrolyte solution for use in this comparative example.

The positive electrode active materials obtained in Examples 1 to 16 and Comparative Examples 1 to 3 were respectively subjected to performance tests as shown below. The test results are shown in Table 2 below.

Performance Test of Lithium Ion Battery

1. DCR (Direct Current Resistance) Test During Initial Discharge

At 25° C., the lithium-ion battery was charged to 4.25V at rate of 1 C, then charged at a constant voltage until the current was less than 0.05 C, and then discharged at a rate of 1 C for 30 min. The voltage at this time was recorded as V1. Then the lithium-ion battery was discharged at a rate of 4 C (the corresponding current at 4 C is I) for 30 s, and the voltage at this time was recorded as V2. The DCR during initial discharge of the lithium-ion battery=(V1−V2)/I, 2. Cycling Performance Test at 60° C.

At 60° C., the lithium-ion battery was charged at a constant current of 1 C to 4.25 V, then charged at a constant voltage of 4.25 V to a current of 0.05 C, stood for 5 min, and then discharged at a constant current of 1 C to 2.5V. The obtained capacity was recorded as initial capacity CO. The above steps were repeated for the same battery, and the cycles were counted. The discharge capacity C300 of the battery after the 300th cycle was recorded, and the cycling capacity retention rate of the battery after 300 cycles is P=C300/CO*100%.

3. Storage Performance Test at 60° C.

At 60° C., the lithium-ion battery was charged to 4.35V at a constant current of 0.5 C, and then charged at a constant voltage to a current of 0.05 C. At this time, the thickness of the lithium-ion battery was measured and recorded as h0. Then the lithium-ion battery was transferred an incubator at 60° C., stored for 30 days, and taken out. The thickness of the lithium-ion battery at this time was measured and recorded as h1. Thickness expansion rate of lithium-ion battery after 30 days of storage=[(h1−h0)/h0]×100%.

TABLE 1

Relevant parameter and performance list of Examples and Comparative example

| | Mass percent of lithium salt, a (%) | [Negative electrode sheet single side] Load W (g/1540.25 mm$^2$) | a/W | Positive electrode sacrificial additive | Content of dimethyl carbonate in percentage by mass, c (%) | DCR (Ω) | Thickness expansion rate (%) after storage at 60° C. | Cycling capacity retention rate (%) after cycles at 60° C. |
|---|---|---|---|---|---|---|---|---|
| Comparative Example 1 | 10 | 0.2 | 50 | — | — | 26.7 | 20.5 | 77.8 |
| Comparative Example 2 | 3 | 0.2 | 15 | — | — | 32.1 | 16.5 | 80.6 |
| Comparative Example 3 | 12 | 0.2 | 60 | — | — | 27.3 | 20.9 | 77.3 |
| Example 1 | 10 | 0.2 | 50 | — | 10 | 24.9 | 16.7 | 81.6 |
| Example 2 | 8 | 0.2 | 40 | — | 10 | 25.3 | 15.4 | 82.1 |
| Example 3 | 7.5 | 0.2 | 37.5 | — | 10 | 25.8 | 14.9 | 83.1 |
| Example 4 | 5 | 0.2 | 25 | — | 10 | 26.5 | 14.1 | 83.5 |

TABLE 2

Relevant parameters and performance list of the lithium-ion batteries of Examples

| | Mass percent of lithium salt a (%) | [Negative electrode sheet single side] Load W (g/1540.25 mm$^2$) | a/W | Positive electrode sacrificial additive | Content of positive electrode sacrificial additive in percentage by mass, b(%) | Content of dimethyl carbonate in percentage by mass, c (%) | 10 × b − 10 × \|0.6 − a/12.5\| | Whether c ≤ 10 × b − 10 × \|0.6 − a/12.5\| | DCR (Ω) | Thickness expansion rate (%) after storage at 60° C. | Cycling capacity retention rate (%) after cycles at 60° C. |
|---|---|---|---|---|---|---|---|---|---|---|---|
| Example 5 | 10 | 0.2 | 50 | 1,3-PS | 4 | 40 | 38 | no | 22.9 | 16.7 | 81.1 |
| Example 6 | 10 | 0.2 | 50 | 1,3-PS | 4 | 30 | 38 | Yes | 23:1 | 16.2 | 82.1 |
| Example 7 | 10 | 0.2 | 50 | DTD | 4 | 30 | 38 | Yes | 23 | 15.2 | 81.9 |
| Example 8 | 10 | 0.2 | 50 | Bis-DTD | 4 | 30 | 38 | Yes | 22.9 | 14.9 | 81.8 |
| Example 9 | 10 | 0.2 | 50 | 1,3-PS | 2 | 15 | 18 | Yes | 23.8 | 16.1 | 82.5 |
| Example 10 | 10 | 0.2 | 50 | 1,3-PS | 3 | 10 | 28 | Yes | 24.9 | 15.8 | 82.7 |

TABLE 3

Relevant parameters and performance list of the lithium-ion batteries of Examples

|  | Mass percent of lithium salt a (%) | [Negative electrode sheet single side] Load W (g/1540.25 mm$^2$) | a/W | Positive electrode sacrificial additive | Content of positive electrode sacrificial additive in percentage by mass, b(%) | Content of dimethyl carbonate in percentage by mass, c (%) | Whether c ≤ 10 × b − 10 × \|0.6 − a/12.5\| | 10 × (5 − 0.08 × a/W) | Whether c ≥ 10 × (5 − 0.08 × a/W) | DCR (Ω) | Thickness expansion rate (%) after storage at 60° C. | Cycling capacity retention rate (%) after cycles at 60° C. |
|---|---|---|---|---|---|---|---|---|---|---|---|---|
| Example 11 | 10 | 0.2 | 50 | 1,3-PS | 4 | 0 | Yes | 10 | no | 25.1 | 14.6 | 82 |
| Example 12 | 10 | 0.2 | 50 | 1,3-PS | 5 | 30 | Yes | 10 | Yes | 24.1 | 14.5 | 82.4 |
| Example 13 | 10 | 0.2 | 50 | 1,3-PS | 3 | 15 | Yes | 10 | Yes | 23.6 | 16.1 | 82.6 |
| Example 14 | 10 | 0.2 | 50 | 1,3-PS | 3 | 5 | Yes | 10 | no | 25.1 | 15.2 | 80.3 |
| Example 15 | 10 | 0.2 | 50 | 1,3-PS | 1.5 | 12 | Yes | 10 | Yes | 26.1 | 15.4 | 82.1 |
| Example 16 | 10 | 0.2 | 50 | 1,3-PS | 3 | 20 | Yes | 10 | Yes | 23:1 | 16.3 | 82.6 |

According to the above results, by using DMC in the solvent of the electrolyte solution, the DCR of Examples 1-16 is significantly lower than that of the comparative example in the presence of the same electrolyte salt concentration. That is, the kinetic performance is improved, and the high-temperature cycling performance is also improved as well.

In Examples 5-16, a positive electrode sacrificial additive is also added to the electrolyte solution, so that when a higher concentration of DMC is used, the expansion of the battery at high temperature is suppressed and the high-temperature cycling performance is improved. It can be seen from Examples 5-10 that when the battery satisfies c≤10× b−10×|0.6−a/12.5|, the high-temperature storage performance and cycling performance of the battery can be further improved. It can be seen from Examples 11-16 that when the battery further satisfies c≥10×(5−0.08×a/W), the DCR is lower, and the dynamic performance of the battery is further improved.

It should be noted that the present application is not limited to the above-mentioned embodiments. The above-described embodiments are merely exemplary, and embodiments having substantially the same technical idea and the same effects within the scope of the technical solution of the present application are all included in the technical scope of the present application. In addition, other embodiments constructed by applying various modifications conceivable to those skilled in the art to the embodiments and combining some of the constituent elements of the embodiments are also included in the scope of the present application.

The invention claimed is:

1. A lithium ion battery, having a positive electrode sheet, a negative electrode sheet, a separator, and an electrolyte solution comprising a lithium salt and a solvent, wherein based on the total weight of a electrolyte solution, a percentage by mass of the lithium salt in the electrolyte solution is a %, and the lithium ion battery satisfies 5≤a≤10; and a load on single side of the negative electrode sheet is W grams per 1540.25 mm$^2$, and a and W satisfy 25≤a/W≤50; and the solvent comprises dimethyl carbonate, wherein based on a total weight of the electrolyte solution, a percentage by mass of the dimethyl carbonate is 5-40%.

2. The lithium ion battery of claim 1, wherein based on the total weight of the electrolyte solution, the electrolyte solution comprises b % by mass of a positive electrode sacrificial additive, the percentage by mass of dimethyl carbonate in the electrolyte solution is c %, and the lithium-ion battery satisfies:

$$c \leq 10 \times b - 10 \times |0.6 - a/12.5|.$$

3. The lithium ion battery of claim 2, wherein the positive electrode sacrificial additive is a compound represented by one of the following general formulas:

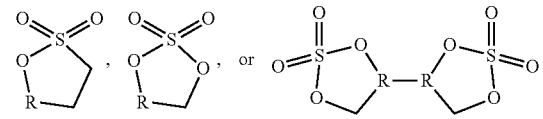

wherein R represents an alkylene group having 1-10 carbon atoms or a carbon atom, the carbon atom optionally being substituted by an alkyl group having 1-9 carbon atoms.

4. The lithium ion battery of claim 2, wherein the positive electrode sacrificial additive is one or more selected from 1,3-propane sultone, ethylene sulfate and bis(ethylene sulfate).

5. The lithium ion battery of claim 2, wherein 2≤b≤4.

6. The lithium ion battery of claim 1, wherein based on the total weight of the electrolyte solution, the percentage by mass of dimethyl carbonate in the electrolyte solution is c %, and the lithium ion battery satisfies:

$$c \geq 10 \times (5 - 0.08 \times a/W).$$

7. The lithium ion battery of claim 1, wherein the positive electrode sheet comprises a positive electrode active material LiNi$_x$Co$_y$Mn$_z$O$_2$, wherein x+y+z=1, 0<x<1, 0<y<1, and 0<z<1.

8. The lithium ion battery of claim 1, wherein the lithium salt is LiPF$_6$.

9. The lithium ion battery of claim 1, wherein 5≤a≤7.5.

10. A battery module, comprising the lithium-ion battery of claim 1.

11. A battery pack, comprising the battery module of claim 10.

* * * * *